United States Patent [19]
Anetsberger et al.

[11] 4,255,106
[45] Mar. 10, 1981

[54] MANUALLY FED DOUGH SHEETER

[75] Inventors: Richard J. Anetsberger; John A. Anetsberger, both of Northbrook, Ill.

[73] Assignee: Anetsberger Brothers, Inc., Northbrook, Ill.

[21] Appl. No.: 78,603

[22] Filed: Sep. 24, 1979

[51] Int. Cl.³ .............................................. A21C 3/02
[52] U.S. Cl. .................................. 425/152; 425/151; 425/337; 425/363
[58] Field of Search ................ 425/151, 152, 337, 363

[56] References Cited

U.S. PATENT DOCUMENTS

| 214,374 | 4/1879 | Berkeley | 425/363 |
|---|---|---|---|
| 1,291,468 | 1/1919 | Frand | 425/151 |
| 1,871,753 | 8/1932 | Smith | 425/337 |
| 3,999,926 | 12/1976 | Victor | 425/337 |

OTHER PUBLICATIONS

Anets Bench Dough-Roller, Model MDR-4C, Brochure, Anetsberger Brothers Inc., Northbrook, Ill.

*Primary Examiner*—James H. Derrington
*Attorney, Agent, or Firm*—McCaleb, Lucas & Brugman

[57] ABSTRACT

A manually fed dough sheeter safely operable by anyone because of novel guard mechanism which physically prevents operator contact with sheeting rollers in operation, comprising dough piece receiving bin with top inlet aperture spaced well above rollers and defining passage thereto, first guard with lower portion blocking passage and movable by dough piece to move an upper portion to close inlet aperture, manually operable pusher for forcibly presenting to rollers dough piece stuck in passage, tray for receiving sheeted dough and enabling manual movement thereof through ninety degrees and sliding into second stage of sheeter, with second guard closely spaced above tray to prevent hand contact with second stage rollers, surface of tray being textured to substantially eliminate frictional resistance to dough sheet movement, and a circuit for controlling operation of roller driving motor manually or automatically for predetermined time in response to dough piece movement of first guard.

9 Claims, 6 Drawing Figures

U.S. Patent  Mar. 10, 1981  Sheet 1 of 2  4,255,106
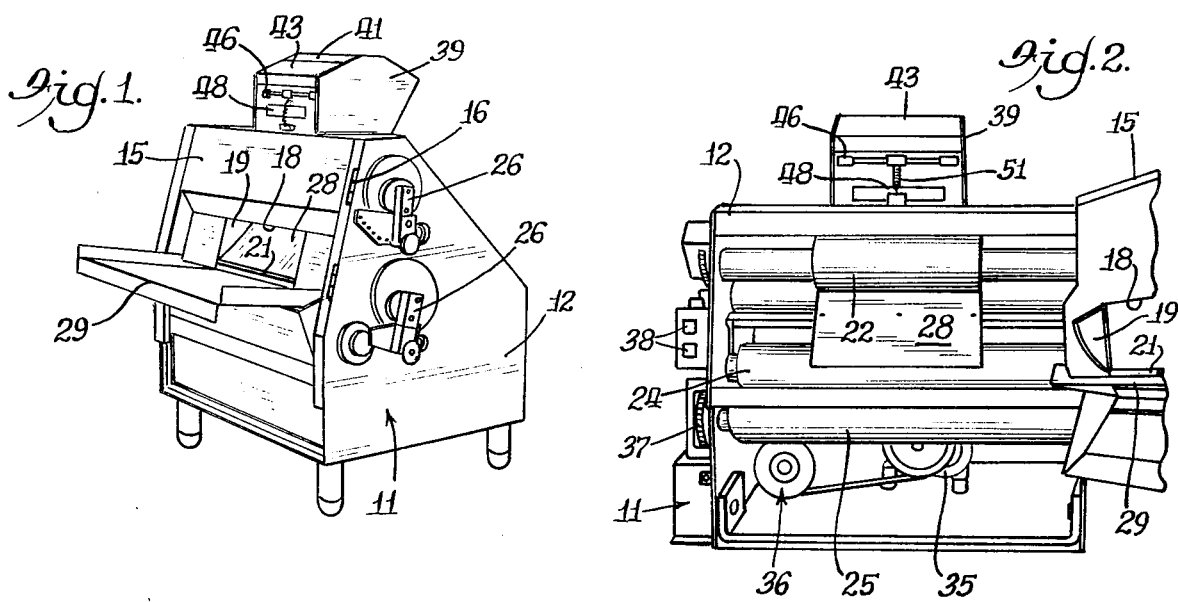
Fig. 1.
Fig. 2.
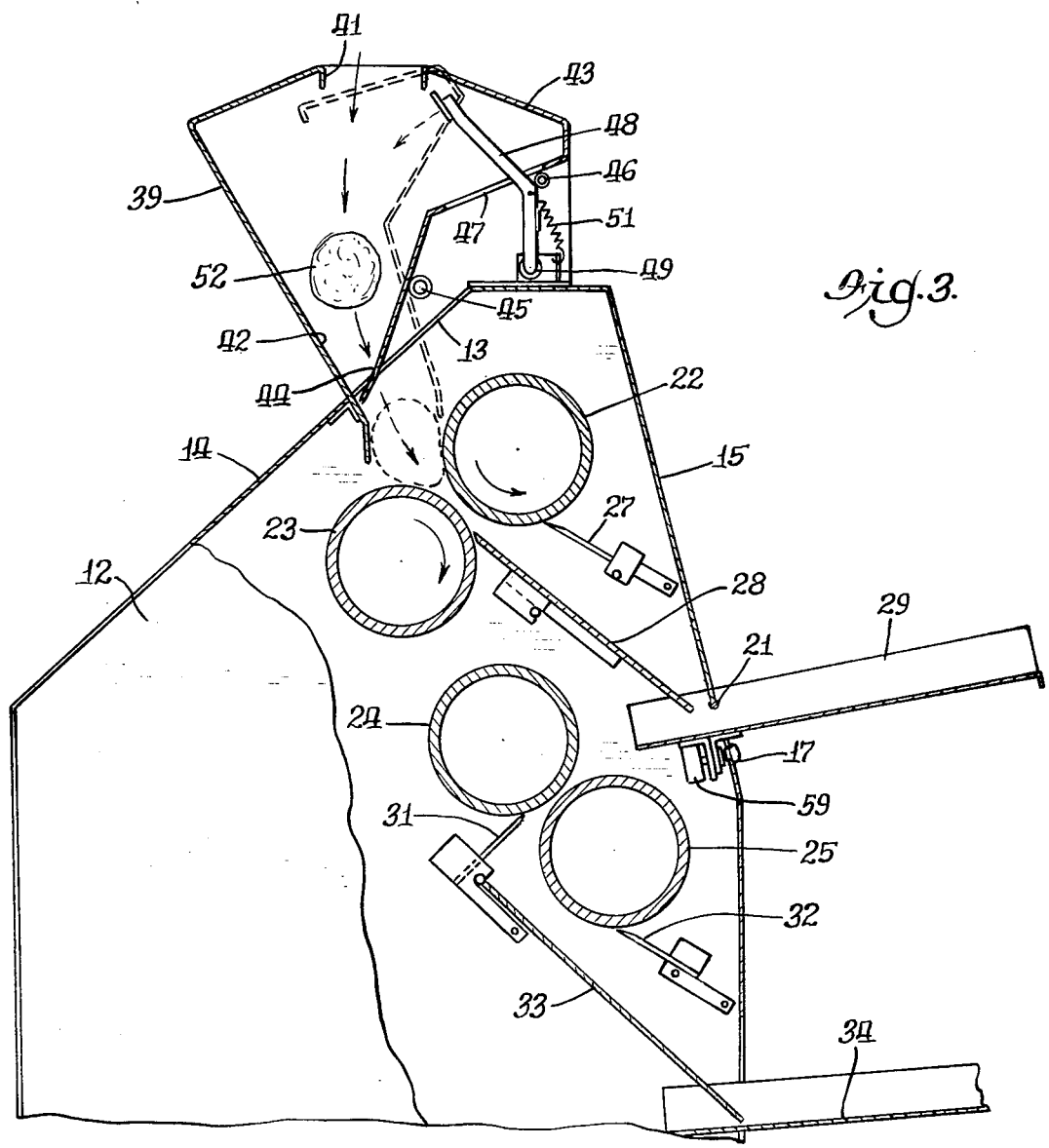
Fig. 3.

MANUALLY FED DOUGH SHEETER

BACKGROUND OF THE INVENTION

1. Field of the Invention

This invention relates generally to dough sheeters, and more particularly those to which the dough is fed manually.

2. Description of the Prior Art

Dough sheeters for many specific products have been provided including both batch and continuous strip forming devices having automatic and manual feeds. With the latter, caution and great care must be exercised by the operator to avoid injury, particularly the catching and crushing of fingers and hands by and between cooperating dough rollers. This is especially true in the case of pizza dough sheeters because of the likelihood of such being used by relatively young and inexperienced operators with the highest incidence of carelessness and inattention.

SUMMARY OF THE INVENTION

This invention comprises a manually fed dough sheeter which is safely operable by anyone because of novel guard mechanism that physically prevents contact of the operator's hands with the dough sheeting rollers when the same are in operation. To this end, a roller-enclosing casing is provided with a receiving bin having an inlet aperture at the top spaced well above the horizontal dough rollers and defining a passage to the latter, and a guard with a lower portion normally blocking access through the passage to the rollers and movable by a dough piece dropped through the inlet aperture to a passage-clearing position to move an upper portion thereof to close the inlet aperture. If this first guard is not so moved by a deposited dough piece, it may be moved to passage-clearing position by manually pushing against its upper portion. A manually operable dough piece pusher also is provided for applying downward pressure against a dough piece, if it does not clear the passage alone or in response to manual actuation of the guard, to forcibly present it to the dough sheeting rollers.

This invention also contemplates the provision of a sheeted dough receiving tray outside of the casing having a textured upper surface to substantially eliminate frictional resistance to dough sheet movement thereon, and a second stage of dough sheeting rollers for receiving such sheeted dough, with a second guard closely spaced above the tray to prevent hand contact with the second stage rollers.

A further feature of this invention comprises a control circuit for actuating a roller driving motor either manually, or automatically for a predetermined time in response to dough piece movement of the first guard.

In the drawings:

FIG. 1 is a perspective view of a dough sheeter embodying the features of the invention;

FIG. 2 is a front elevational view of the same with parts omitted and the front closure member partially shown in an open position;

FIG. 3 is a vertical end elevation on an enlarged scale with parts broken away and partly in vertical section;

DESCRIPTION OF THE PREFERRED EMBODIMENT

Figure 4:
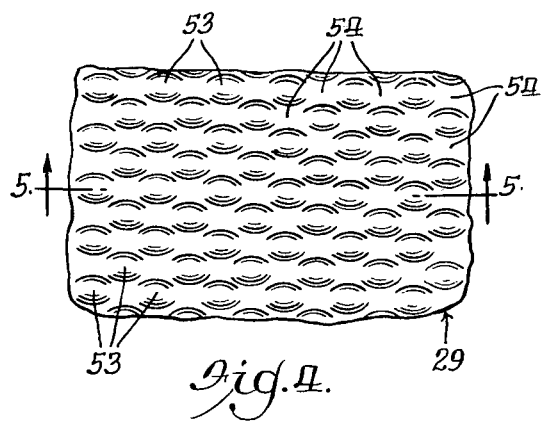
FIG. 4 is a detail top plan view of a portion of the sheeted dough receiving tray.

The preferred embodiment illustrated comprises a countertop pizza dough double sheeter, indicated generally by reference numeral 11, including an outer roller-enclosing casing 12 having an opening 13 adjacent the upper end of a rear wall 14 (FIG. 3) and an open front portion closed by a closure member 15 preferably hinged at its right end at 16 (FIG. 1) and held in closed position by suitable locking bolt and threaded aperture means 17 (FIG. 3). The closure member 15 has a laterally central aperture 18 (FIG. 1) with rearwardly extending guard flanges 19 at its ends and a guard rod 21 extending horizontally across its bottom.

The dough rollers are mounted in well known manner within the casing 12 and comprise upper and lower first stage rollers 22 and 23 and a lower second stage of upper and lower rollers 24 and 25. The upper rollers 22 and 24 are journaled in eccentrically mounted discs that may be selectively rotated and held in adjusted position by well known manually actuated means 26 at one end of the casing 12 (FIG. 1), whereby the distance between the rollers of each stage may be selectively adjusted to obtain the desired dough thicknesses. The usual scrapers are provided for insuring removal of the dough from each roller, such as scraper 27 associated with roller 22 (FIG. 3), and the first stage is completed by a rolled dough discharge chute 28 the lower end of which extends into a sheeted dough receiving tray 29 mounted in any suitable manner on the front closure member 15 and extending forwardly therefrom, preferably at a slight upward angle. The lower second stage comprises upper roller 24 and lower roller 25, with scrapers 31 and 32, respectively, mounted for cooperation therewith, and a rolled dough discharge chute 33 for delivering the sheeted dough to a receiving tray 34 extending outwardly from the casing 12 through a suitable lower aperture therein. As illustrated in FIG. 2, an electric motor 35 is provided for actuating suitable drive means indicated generally by reference numeral 36 and including endless chain or belt means 37 for driving the dough rollers 22-25, and stop and start control buttons 38 and 38a are mounted adjacent one end of the casing 12 for manually controlling operation of the motor. Automatic energization of the motor for a predetermined time in response to deposit of a dough piece is effected in a manner later to be described, and safety means are connected in the motor circuit, including one switch held closed by the closure member 15 when the latter is in closed position and automatically opened whenever the closure member 15 starts to swing open to open the motor circuit and thus prevent rotation of the rollers 22-25.

Mounted on the upper part of the casing 12 and over the opening 13 therein is a dough piece receiving bin 39 having an inlet aperture 41 at its top (FIG. 3) and rear and end walls defining a downward passage 42 leading to the inlet bite of the first stage rollers 22, 23. An open front portion of the bin 39 is closed by a guard mechanism comprising a upper portion 43 flanged at its rear end to normally define the front edge of the inlet aperture 41, and a lower portion 44 normally blocking the passage 42. The guard mechanism 43, 44 preferably is formed from a single piece of sheet metal and is pivotally mounted at 45 on the end walls of the bin 39, the greater weight of the upper portion 43 maintaining it against a horizontal stop rod 46 extending between the bin end walls. A slot 47 in the lower part of the upper portion 43 affords clearance for the vertical arm of a dough piece pusher 48 which is pivotally mounted at its lower end at 49 in any suitable manner and is held against the stop rod 46 by a spring 51.

Mixed dough is separated into pieces 52 of suitable size in well known manner, and such a dough piece is dropped by the operator through the inlet aperture 41 into the passage 42 of the receiving bin 39 for sheeting by the first stage rollers 22, 23. The deposited dough piece 52 normally will fall against the lower portion 44 of the guard mechanism, as indicated by the arrows in FIG. 3, to swing it and the upper portion 43 to the broken line position shown therein, the dough piece then falling between the first stage rollers 22, 23. Manual access to those rollers is prevented by the closing of the inlet aperture 41 by the upper portion 43 of the guard. If the dough piece should not so swing the guard, the lower portion 44 will block manual access to the rollers 22, 23, and it cannot be swung to inoperative position by reaching a hand or arm through the inlet aperture 41 because that would block movement of the upper portion 43 into the inlet aperture 41. If manual movement of the guard 43, 44 to its broken line position of FIG. 3 by the upper portion rearwardly does not release a piece of dough 52 that is stuck in the passage 42, that may be accomplished by manual operation of the dough piece pusher 48 against the action of spring 51 to forcibly present that dough piece to the rollers 22, 23. In any event, this guard mechanism completely eliminates any possibility of an operator being injured by the rollers 22, 23.

As a dough piece 52 is sheeted by the first stage rollers 22, 23, it is delivered by the discharge chute 28 onto the tray 29. That dough sheet may be moved on the tray manually by the operator through ninety degrees without removal from the tray and slid rearwardly therefrom onto the lower roller 25 of the second stage from which it will be delivered by the discharge chute 33 to the final sheeted dough receiving tray 34. Because of the guard rod 21 across the lower end of the aperture 18 in the closure member 15 being closely spaced above the tray 29, any finger or hand contact by an operator with the rollers 24, 25 of the second stage is not possible. Consequently, the dough sheeter of this invention is operable by even inexperienced, careless or inattentive operators without any chance of injury.

Figure 5:
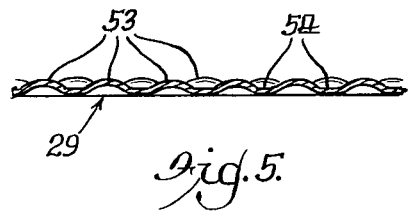
FIG. 5 is a vertical sectional view taken substantially on the line 5—5 of FIG. 4.

As shown in FIGS. 4 and 5, the tray 29 has a textured or "quilted" upper surface comprising raised portions 53 separated from each other by depressions 54 which may be formed by stamping or rolling. As compared to a smooth surface, such as with a flat sheet of stainless steel, this textured surface retains some flour, either from the dough or dusted on it, in the depressions 54 and substantially eliminates sticking of the dough or frictional resistance to dough sheet movement on it. An operator thus is able to easily and quickly move the sheeted dough on the tray 29 through ninety degrees and slide it under the guard rod 21 onto the lower roller 25 of the second stage for completion of the double sheeting operation.

As previously noted, the manual start switch 38 and stop switch 38a are connected in the circuit for the roller driving motor 35 to enable selective operation thereof. This is illustrated in the wiring diagram of FIG. 6 wherein the hot or plus line 55 and the neutral or negative line 56 of a suitable 120 volt AC power source are shown, with the inclusion in the circuit of a power relay 57, a contractor 58, and normally closed safety microswitches 59. When the normally open start switch 38 is closed manually, a circuit is completed through the coil of the power relay 57 which causes closing of its normally open switches to energize the coil of the contactor 58 to close its normally open switches to complete a circuit through the motor 35.

Figure 6:
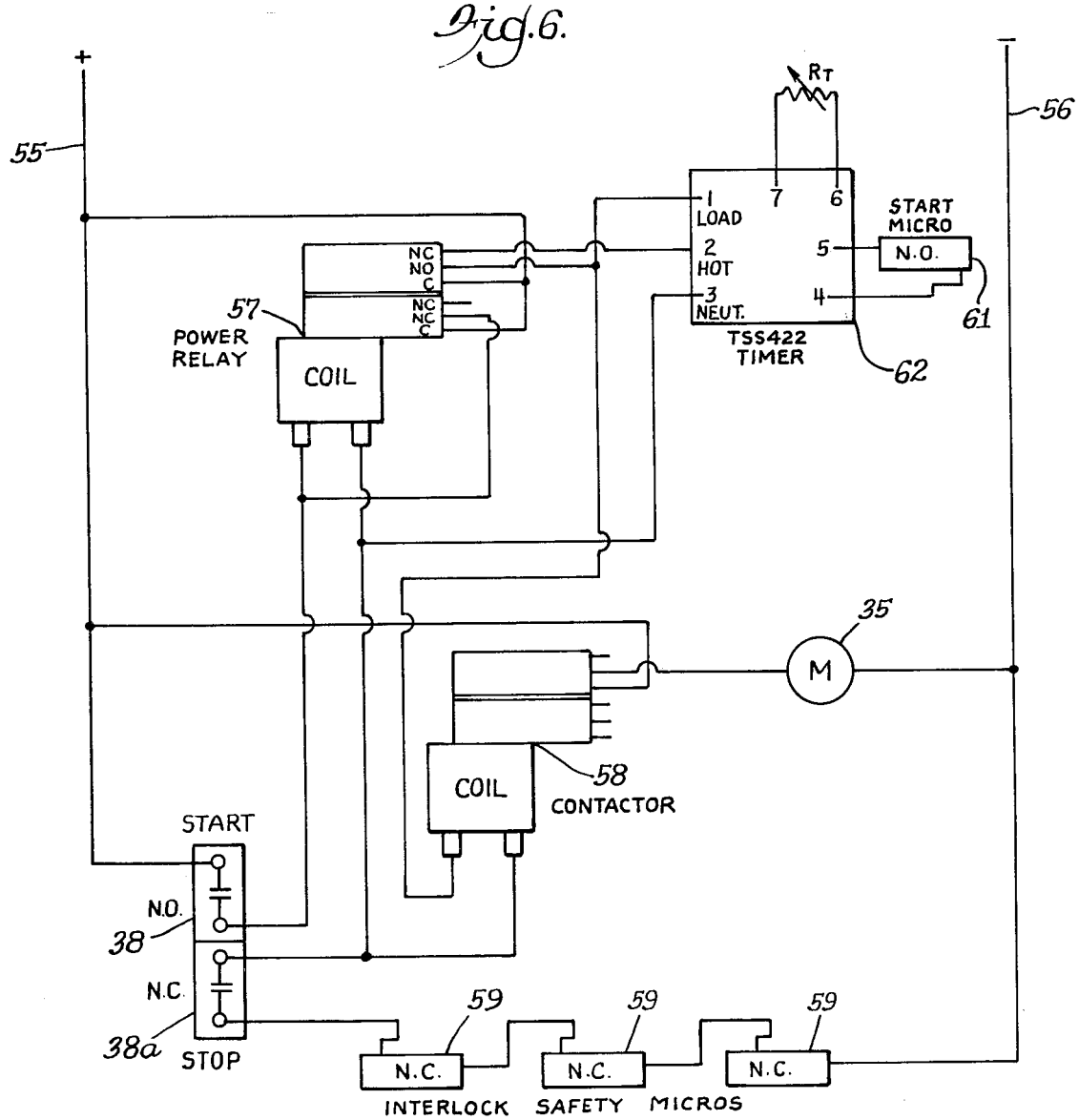
FIG. 6 is a wiring diagram of the motor control circuit.

Also included in the motor control circuit is a normally open start microswitch 61 and a solid state timer 62, as shown in FIG. 6. The switch 61 is mounted in the dough piece receiving bin 39 in a position to be closed automatically by and in response to movement of the guard 43, 44 from its normal full line position to its operated broken line position of FIG. 3. The closing of switch 61 initiates operation of the timer 62 to energize the coils of the power relay 57 and contactor 58 and thereby complete a circuit through the motor 35. At the end of a predetermined period, the timer returns to normal position to break the circuit to the motor automatically. In practical operation it is preferred that the motor thus be energized for ten seconds, but if the timer 62 is adjustable that period may be varied as desired. It wll be appreciated that one of the safety microswitches 59 will be positioned, as earlier noted, to be normally maintained closed by the locking bolt means 17 (FIG. 3) when the bolt or thumbscrew thereof is screwed all the way in and is opened automatically as the thumbscrew is started to be unscrewed to enable the front closure member 15 to be swung open so as to immediately deenergize the motor 35 and prevent its operation until the closure member is locked in closed position. The other safety switches 59 likewise are mounted for cooperation with other portions of the roller enclosing casing 12 which may be opened to give access to the rollers 22-25 and all of these safety switches have to similarly be activated or closed before the machine becomes operational.

It is thought that the invention and many of its attendant advantages will be understood from the foregoing description, and it will be apparent that various changes may be made in the form, construction and arrangement of the parts without departing from the spirit of the invention or sacrificing all of its material advantages, the form hereinbefore described and shown in the drawings being merely a preferred embodiment thereof.

The embodiments of the invention in which an exclusive property or privilege is claimed are defined as follows:

1. A dough sheeter, comprising dough sheeting rollers cooperating to roll out a dough piece presented thereto, a roller-enclosing casing, a dough piece receiving bin disposed above said casing providing a downward passage to said rollers and having an inlet aperture at its top, and guard mechanism having a lower portion normally blocking said passage to said rollers and movable by a dough piece dropped through said inlet aperture, and an upper portion movable in response to such movement of said lower portion to close said inlet aperture to positively block access to said passage through said aperture.

2. In a dough sheeter according to claim 1, a dough piece pusher manually operable to forcibly present to said rollers a dough piece that may have become stuck in said passage.

3. A dough sheeter according to claim 1, wherein said rollers include an upper first stage, a first stage dough discharge chute, and a sheeted dough receiving tray disposed therebelow and extending outwardly from said casing.

4. A dough sheeter according to claim 3, wherein said casing has a front opening and a front closure member therefor, said receiving tray being mounted upon and extending forwardly from said closure member.

5. A dough sheeter according to claim 4, wherein said rollers include a lower second stage, whereby dough on said tray sheeted by said first stage may be moved manually through ninety degrees without removal therefrom and slid rearwardly into said second stage, with a lower portion of said front closure member being closely spaced above said tray to enable delivery to the latter of dough sheeted by said first stage and to prevent hand contact by an operator with the rollers of said second stage.

6. In a dough sheeter according to claim 1, a sheeted dough receiving tray extending outwardly from said casing comprising textured metal providing an upper surface defining raised portions separated from each other by depressions to substantially eliminate frictional resistance to dough sheet movement thereon.

7. A dough sheeter according to claim 1, comprising an electric motor for actuating said rollers, and a control circuit for said motor including a timer, a power relay, a contactor and a normally open microswitch mounted for temporary closing by movement of said guard mechanism to close said inlet aperture, whereby operation of said timer is initiated to energize said power relay, contactor and motor for a predetermined time period and to automatically deenergize said motor at the end of said predetermined period.

8. A dough sheeter according to claim 7, wherein said control circuit includes a normally open start switch closable manually to initiate operation of said motor, and a normally closed stop switch operable manually to deenergize said motor.

9. In a dough sheeter according to claim 7, a normally closed closure member mounted on said casing for movement to open position to provide access to said rollers, and safety switch means included in said circuit normally held closed by said closure member and opened automatically in response to initial opening movement of said closure member to deenergize said motor.

* * * * *